United States Patent [19]

Ishii et al.

[11] Patent Number: 4,918,485
[45] Date of Patent: Apr. 17, 1990

[54] ROLL FILM CAMERA

[75] Inventors: Kenjiro Ishii; Fumio Fukumoto; Koichi Nagata, all of Osaka; Akira Shibata, Tokyo, all of Japan

[73] Assignee: Minolta Camera Kabushiki Kaisha, Osaka, Japan

[21] Appl. No.: 334,295

[22] Filed: Apr. 6, 1989

[30] Foreign Application Priority Data

Apr. 6, 1988 [JP] Japan .................................. 63-83096

[51] Int. Cl.⁴ ...................... G03B 27/32; G03B 27/52; G03B 1/60
[52] U.S. Cl. ..................................... 355/64; 352/172; 354/218
[58] Field of Search .............. 235/91 C; 352/171, 172; 354/218; 355/64; 242/208-210

[56] References Cited

U.S. PATENT DOCUMENTS 3,816,842  6/1974  Glaros et al. ................... 352/172 X
4,576,455  3/1986  Fazekas .......................... 352/171 X
4,758,851  7/1988  Zeth ............................... 354/218 X

FOREIGN PATENT DOCUMENTS 58-75164   5/1983  Japan .
59-68748   5/1984  Japan .
294227    12/1987  Japan .

Primary Examiner—Richard A. Wintercorn
Attorney, Agent, or Firm—Price, Gess & Ubell

[57] ABSTRACT

A roll film camera is disclosed which comprises a supply reel for winding the part of a roll of recording medium yet to be used and a takeup reel for winding the part of the recording medium already used for photographing original images. This camera is constructed so as to be loaded with a plurality of types of recording medium which differs in thickness. The length of the part of the recording medium yet to be used is shown in a displaying part, according to the type of recording medium. When the residual amount of the recording medium of a given type decreases below a prescribed length, an alarm is issued which prompts the operator to make preparation for the loading of a new recording medium.

14 Claims, 4 Drawing Sheets

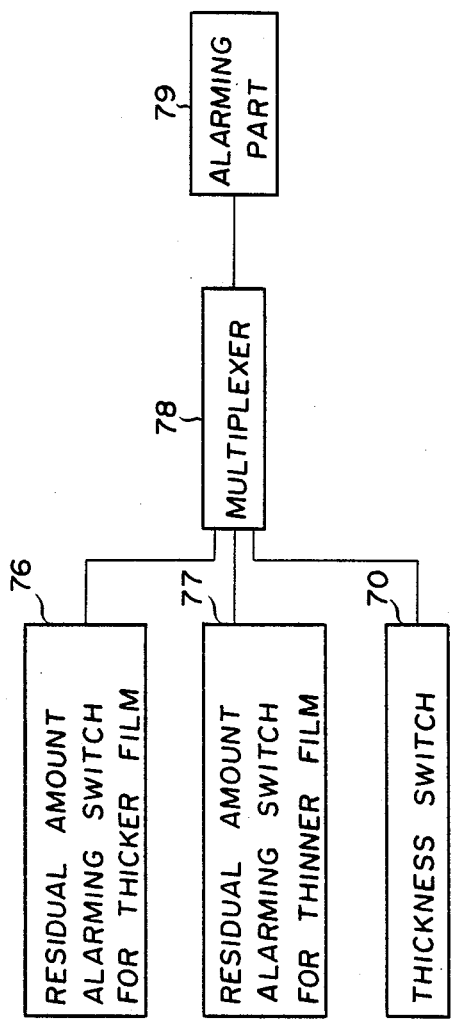

ROLL FILM CAMERA

BACKGROUND OF THE INVENTION

1. Field of the Invention

This invention relates to a residual roll film detection device for detecting the amount of usable roll film remaining on a supply reel in a camera.

2. Description of the Related Art

The microfilm camera is used for photographing original images recorded in documents of various forms on a microfilm. The microfilm camera basically comprises a document table supporting the documents mentioned above and a camera head disposed above the document table.

The interior of this camera head is so adapted that a supply reel having wound thereon the unused part of a roll of microfilm or roll film and a take up reel intended to take up thereon the part of the roll film on which original images recorded on documents have been already photographed will be detachably mounted therein. As the work of photographing original images on the microfilm by the use of the microfilm camera constructed as described above proceeds, the roll film moves from the supply reel to the takeup reel. When the part of the roll film wound on the supply reel eventually ceases to exist, the roll film thus used up must be replaced with a new roll film.

In order for the work of preparing the new roll film for insertion in the camera to be carried out with expedition, the microfilm camera is furnished with a device capable of externally detecting the length of the part of the roll film still wound on the supply reel, namely, the amount of the residual roll film.

The outside diameter of the part of the roll film still wound on the supply reel is directly in proportion to the remaining length of the roll film. It has been, therefore, customary to indicate on a display part the remaining length of the roll film calculating from the outside diameter of the roll film. The idea of detecting the residual amount of roll film based on the diameter as mentioned above is basically equal to the technique employed in detecting the residual amount of roll paper in a copying machine using a roll paper as disclosed in Japanese Patent Laid-Open Application SHO No. 58(1983)-75,164 or in detecting the residual amount of roll paper in a laser printer using a roll paper as disclosed in Japanese Patent Laid-Open Application SHO No. 59(1984)-68,748. In the conventional copying machine mentioned above, a roll paper holder is provided on one lateral face thereof with a partially cutaway display part and the display part is furnished in the proximity thereof with an indicating scale. The operator is allowed to find the residual length of roll paper by visually reading the outside diameter of the roll paper against this scale. The printer mentioned above is provided with two residual roll paper detecting pieces and is enabled to indicate the residual amount of roll paper by the fact that one of the detecting pieces left in contact with the peripheral surface of the roll paper eventually comes into contact with the other detecting piece and established electric conductivity when the diameter of the roll paper decreases to a prescribed value.

The roll film heretofore used in the microfilm camera has had a limited thickness, t, of 5 mils (5/1000 inch or 0.127 mm). For the purpose of increasing the capacity of one roll film for original images to be photographed thereon, a roll film having a smaller thickness of 2.5 mils has been developed. It has aroused an earnest desire to provide a camera head which is usable convertibly with the roll film of this small thickness and the conventional roll film of large thickness.

In the conventional system in which the diameter of a roll film wound on a reel is directly converted into the residual amount of this roll film and the result of this conversion is indicated on the display part, however, since the residual amount calculated from the diameter is variable with the thickness of film, the display of the exact residual amount is not obtained with respect to either of two roll films differing in thickness.

SUMMARY OF THE INVENTION

An object of this invention is to provide a roll film camera which allows original images to be photographed on any of a plurality of roll films differing in thickness.

Another object of this invention is to provide a roll film which is possessed of a display part such that the operator is allowed to find the residual length of the roll film mounted inside the camera head from the reading indicated thereon.

Yet another object of this invention is to provide a roll film camera which is provided with an alarm unit issuing a signal calling the operator's attention when the residual length of the roll film has decreased past a prescribed level.

In accordance with one aspect of the present invention, there is provided a roll film camera for photographing original images on a strip of film wound up in a roll, which comprises: a supply reel for winding thereon the part of said roll film yet to be used for photographing original images, a takeup reel for winding the part of said roll film already used for photographing original images, photographing means disposed between said supply reel and said takeup reel and adapted to expose said roll film to original images and effect the photographing of original images on said roll film, takeup means for causing said roll film to be taken up on said takeup reel from said supply reel synchronously with the photographing motion of said photographing means, detecting means for detecting the diameter of said roll film wound on said supply reel, designating means for designating the thickness of said roll film, and converting means for converting the diameter of said roll film detected by said detecting means into the length of said roll film in accordance with the thickness of said roll film designated by said designating means.

The length of the part of the unused roll film still found on the supply reel decreases in proportion as the photographing of original images on the roll film progresses. Since the residual length of the roll film is indicated on the display part, the operator is always allowed to know exactly the residual length of the roll film displayed in accordance with the thickness of the film.

When the residual length of the roll film decreases past a prescribed level without reference to the thickness of the film, the alarm unit is actuated to issue a signal calling the operator's attention to that fact. As the result, the operator is enabled to know more exactly the time for change of films and thereby prepare for rapid insertion of a new roll of film in the camera head.

BRIEF DESCRIPTION OF THE DRAWINGS

FIG. 4 is a block diagram illustrating a control circuit for the microfilm camera of the present invention.

DESCRIPTION OF THE PREFERRED EMBODIMENTS

Now, the apparatus of this invention for the detection of the residual amount of a roll film will be described in detail below with reference to the illustrated embodiment.

Figure 1:
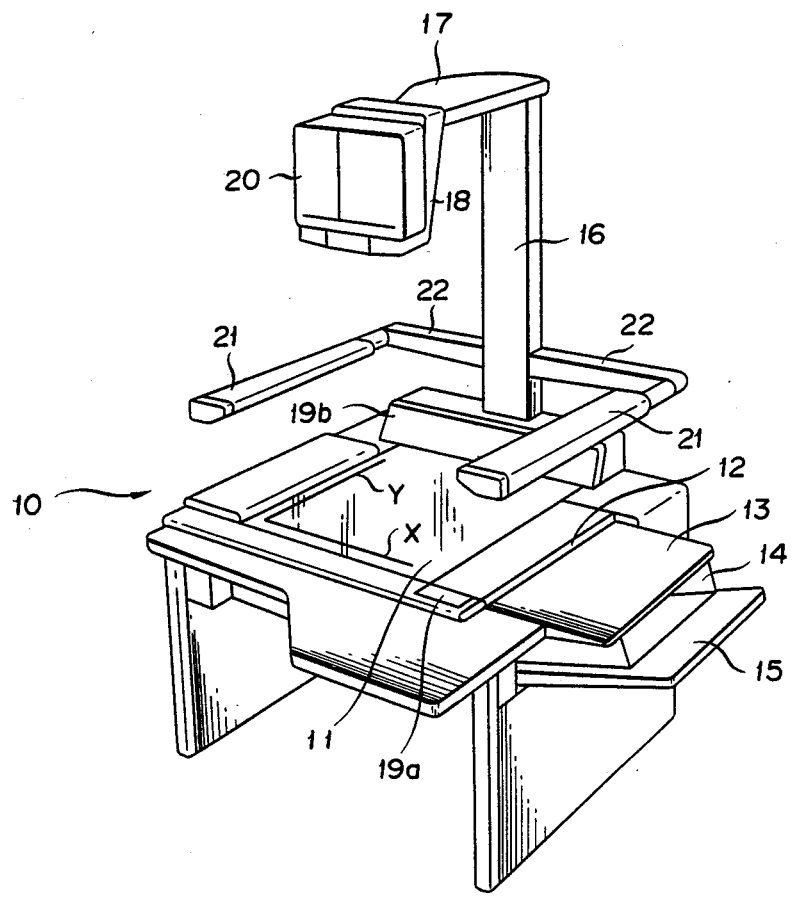
FIG. 1 is a perspective view illustrating a photographing apparatus incorporating therein a microfilm camera of the present invention.

A base table 10 serving as a document stand is provided, as illustrated in FIG. 1, with a document retainer glass 11. A document conveying device (not shown) set in place under this glass 11. A document in the form of the sheet is advanced along the lower side of the glass 11. A document insertion inlet 12 is formed in the upper righthand part of the base table 10. Documents mounted on a supporting stand 13 which is installed as juxtaposed to the insertion inlet 12 are manually fed in one by one and conveyed by the document conveying device. Below the insertion inlet 12 is disposed a supporting stand 15 provided with an automatic document insertion hole 14. This supporting stand 15 allows sheetlike documents piled up therein to be automatically conveyed one after another along the lower side of the glass 11. Optionally, a document may be directly spread on the glass to have an original image recorded thereon to be photographed.

At the center in the rear part of this base table 10, a supporting pole 16 is erected. To this supporting pole 16, a holder 18 is attached through the medium of a beam 17 fixed to the leading end of the supporting pole 16. To this holder 18 is attached a camera head 20. The base stand 10 is provided in the front part and the rear part thereof respectively with operating panels 19a, 19b.

Each of the documents manually inserted one by one through the insertion inlet 12 and conveyed by the document conveying device to the position below the glass 11 or each of the documents piled up on the supporting stand 15 and conveyed one after another by the conveying device through the insertion inlet 14 to the position below the glass 11 is set in place so that the corner thereof conforms exactly with the position indicated by the symbols X and Y in FIG. 1. As a result, a so-called corner registration of a document is accomplished. This corner registration holds good even when the document is directly spread on the glass 11. The document is photographed as held in such a position that the corner thereof is correctly aligned with that between the reference lines X and Y. The camera head 20 is adapted to be shifted, in conjunction with the holder 18, back and forth and right and left, namely to be moved vertically toward the corner, depending on the size of the document positioned as described above, so that the original image recorded on the document may be wholly photographed.

To the supporting pole 16 is attached an arm 22 which is provided at the opposite ends thereof with illuminators 21 each incorporating therein a light source. These illuminators 21 are adapted so that the beams of light emitted therefrom will impinge on the glass 11.

Figure 2:
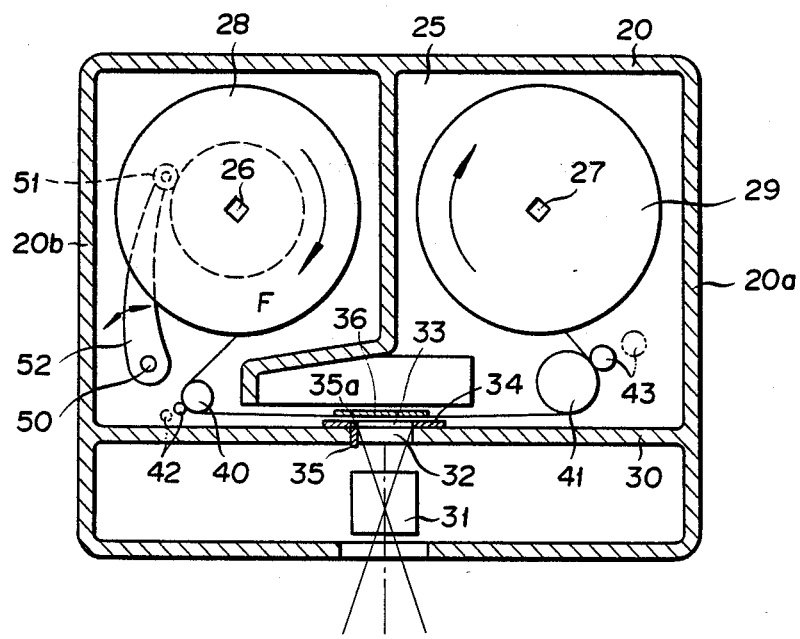
FIG. 2 is a cross section illustrating the interior of the camera head shown in FIG. 1.

FIG. 2 is a diagram illustrating the interior of the camera head 20 shown in FIG. 1. A film chamber 25 is formed inside the camera head 20. This film chamber 25 is provided projectingly therein with a feed shaft 26 and a takeup shaft 27. The feed shaft 26 is adapted so that a supply reel 28 will be fitted thereon and the takeup reel 27 is adapted so that a takeup reel 29 will be fitted thereon.

In a partition wall 30 of a case 20a forming the camera head 20, an opening 32 is formed to permit passage of the light penetrating through a lens 31 attached to the camera head 20. To the inner surface of the partition wall 30 is attached a stationary plate 34 which has an opening 33 formed therein at a position aligning with the opening 32 mentioned above. In the stationary plate 34, a movable plate or an aperture switching plate 35 is disposed switchably about an axis 35a. By the switching of this movable plate 35, the area of the aperture formed by the opening 33 will be changed between large and small sizes. When the document to be photographed has a small size such as A4, for example, the movable plate 35 is closed to set the area of the aperture to half size. When an original of the document having a large size of A3 is to be photographed at the same ratio of reduction, the movable plate 35 is opened to set the area of the aperture formed by the opening 33 to the same full size as the opening 32 mentioned above.

The camera head 20 is provided therein with a pressing plate 36 which is adapted to urge the microfilm F being paid out of the supply reel 28 and wound on the takeup reel 29 closely toward the stationary plate 34 and the movable plate 35. For the microfilm F to be guided beneath the pressing plate 36, a guide roller 40 is rotatably disposed below the supply reel 28. Further, for the purpose of regulating the position of movement of the microfilm F which has passed the guide roller 40 and, at the same time, conveying the microfilm F forward, a metallic feed roller 41 is disposed below the takeup reel 29. The feed roller 41 is interlocked with a stepping motor 37 which is driven as controlled with pulses of electric current. The rotation imparted by this stepping motor 37 to the feed roller 41 fixes the amount of conveyance of the film F.

To permit fast contact of the film F with the guide roller 40, a guide roller 42 is installed as juxtaposed to the guide roller 40. Then, to permit fast contact of the film F with the feed roller 41, another guide roller 43 is installed as juxtaposed to the feed roller 41. To facilitate the work of mounting the microfilm F in the camera head 20, the guide roller 42 is adapted to make and break contact readily with the guide roller 40. When the guide roller 42 breaks contact with and departs from the guide roller 40, it assumes the position indicated by an imaginary line in FIG. 2. Similarly, the guide roller 43 is enabled to make and break contact with the adjacent feed roller 41. The state which the guide roller 43 assumes after breaking this contact is indicated by an imaginary line similarly.

The conveyance of the film F is effected by the rotation of the feed roller 41 as described above. For the film F played out from between the feed roller 41 and the guide roller 43 to be securely wound on the takeup reel 29, a feeble torque is exerted upon the takeup reel 29 in the rotational direction indicated by the arrow. To prevent the film F dispensed by the supply reel 28 from sagging, a weak braking or frictional force is exerted on the supply reel 28.

Figure 3:
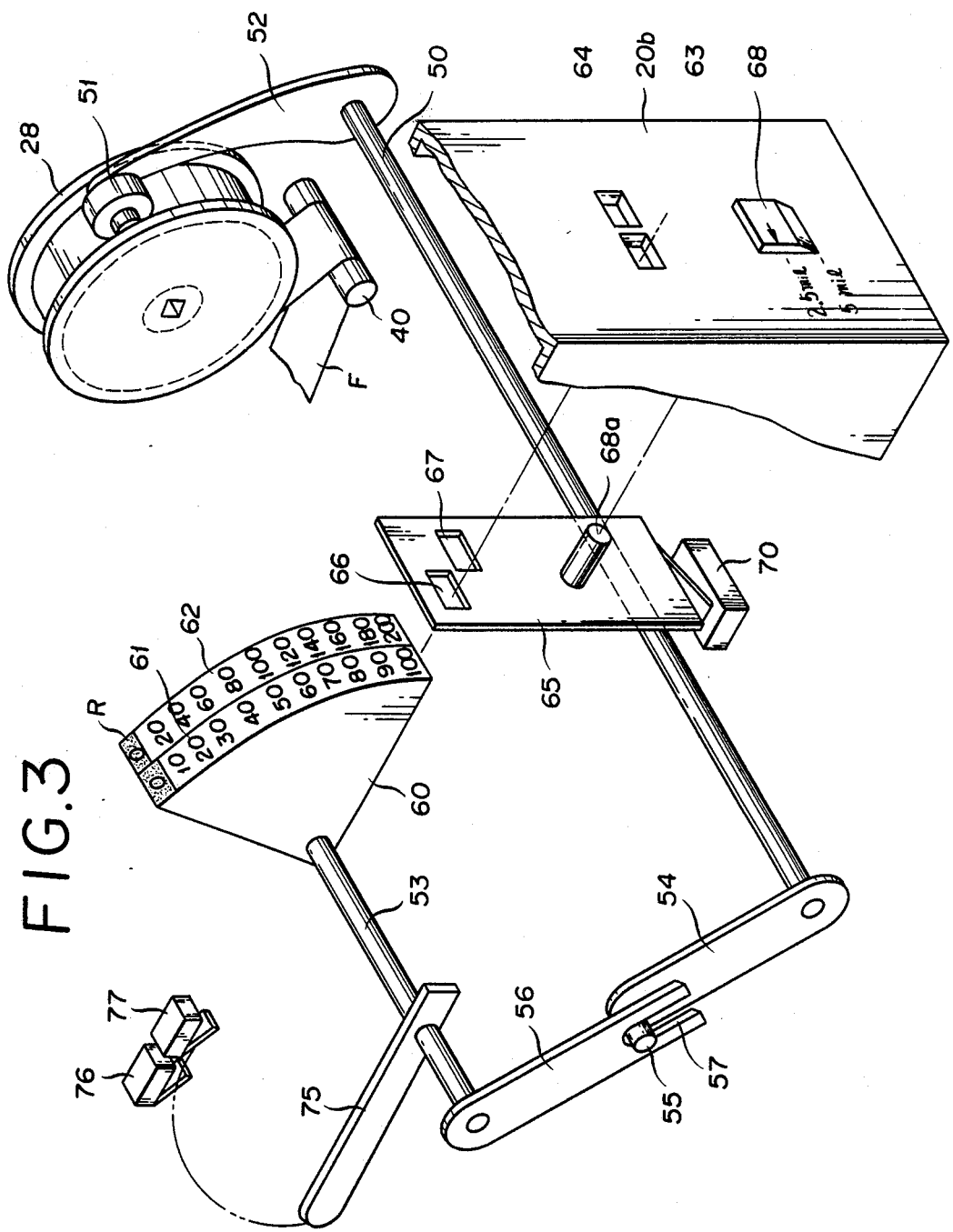
FIG. 3 is an exploded perspective view illustrating a mechanism for detecting the residual amount of a roll of film as one embodiment of the present invention.

FIG. 3 is a diagram illustrating an essential part of a typical apparatus of this invention for detecting the residual amount of a roll of film. In the camera head 20, an interlocking shaft 50 is rotatably attached in place. A residual amount detecting lever 52 provided with a roller 51 contacting the peripheral surface of the roll film F wound up in a cylindrical shape around the supply reel 28 is fixed at one end of the interlocking shaft 50. The position of attachment of the interlocking shaft 50 is near the supply reel 28 as illustrated in FIG. 2. The lever 51 mentioned above is urged by a resilient member (not shown) in a manner such as to generate a resilient force tending to direct the roller 51 toward the peripheral surface of the roll film F. The lever 51 is kept rotated counterclockwise in the position of FIG. 2 against the resilient force during the installation of the supply reel 28 in the camera head.

The residual amount detecting lever 52 is adapted to rotate clockwise in the position of FIG. 2 in proportion as the operation of photographing original images by the use of the microfilm camera proceeds. The length of the unused part of the film F wound on the supply reel 28, therefore, can be detected by virtue of the angle of this rotation.

An operating shaft 53 is rotatably attached inside the camera head 20 as disposed parallelly to the interlocking shaft 50. This operating shaft 53 is adapted to be driven by the interlocking shaft 50. An interlocking lever 54 is fixed at the other end of the interlocking shaft 50 for the purpose of permitting transmission of the rotary motion of the interlocking shaft 50 to the operating shaft 53. An engaging pin 55 projected from the leading end of the interlocking lever 54 is in mesh with an engaging groove 57 at the leading end of engaging lever 56 fixed at one end of the operating shaft 53.

A sector-shaped residual amount display plate 60 is fixed to the other end of the operating shaft 53. Since the illustrated embodiment contemplates permitting alternative use of two kinds of roll film F differing in thickness, a residual amount display scale 61 for a thicker film and a residual amount display scale 62 for a thinner film are inscribed in parallel files on the arcuate peripheral surface of the operating shaft 53 at a fixed radius from the center of rotation of the operating shaft 53. In the illustrated embodiment, the scales 61, 62 are graduated in units of foot. The ground of each of the scales in the portion not exceeding the graduation of 5 feet (about 1.52 m) is colored in red, R, as shown with dots in FIG. 3 and the ground in the remainder portion in white, for example. This differentiation of the group ground of the scale 61 or 62 in the portion not exceeding the graduation of 5 feet from the remainder portion by the use of two different colors as described above serves the purpose of calling the operator's attention and displaying an alarm.

In the case 20a forming the camera head 20 illustrated in FIG. 1, a partitioning wall part denoted by the symbol 20b in the same drawing is perforated to form therein a display window 63 for displaying the residual length of the thicker film and a display window 64 for displaying the residual length of the thinner film as illustrated in FIG. 1. These windows are juxtaposed to each other on one and the same level. A switching plate 65 is fitted slidably in the vertical direction in the position of FIG. 1 between the inner face of the partitioning wall part 20b and the residual amount display plate 60.

This switching plate 65 is perforated to form therein two vertically staggered through holes 66, 67. The through hole 66 is for showing the residual amount scale 61 for thicker film and the through hole 67 the residual amount scale 62 for the thinner film.

A switching knob 68 exposed on the outer surface of the partitioning wall part 20b as vertically movably attached thereto is adapted to be attached to the switching plate 65 in order that the switching plate 65 may be moved alternatively between two vertical position. The attachment of the switching knob 68 to the switching plate 65 is accomplished by bringing the switching knob 68 into engagement with a connecting pin 68a fixed on the switching plate 65. When this switching knob 68 is moved to the upper position, the through hole 67 formed in the switching plate 65 comes into conformity with the display window 64, and, consequently, the residual amount scale 62 for the thinner film 2.5 mils in thickness is rendered visible from outside. Conversely, when the switching knob 68 is moved to the lower position, the through hole 66 comes into conformity with the through window 63 and, as the result, the residual amount display scale 61 for the thicker film 5 mils in thickness is rendered visible from outside.

Inside the camera head 20, a thickness switch 70 illustrated in FIG. 3 is attached. This thickness switch 70 is turned ON and OFF by the movement of the switching plate 65 in the upward and downward directions. When the switching plate 65 is move downwardly, the switch 70 is turned ON to forward to the control circuit a signal indicating that a thicker film has been loaded. At the same time, the window 63 comes into conformity with the through hole 66 and the other window 64 is closed to display the residual length of the thicker film. Conversely, when the operator manipulates the switching knob 68 and moves the switching shaft 65 upwardly, the thickness switch 70 is turned OFF to forward a signal indicating that the thinner film has been loaded. At the same time, the display window 64 comes into conformity with the through hole 67 and the other display window 63 is closed, to display the residual length of the thicker film.

An alarming lever 75 is fixed to the operating shaft 53 and it is adapted to be rotated in concert with the operating shaft 53. Two residual amount alarming switches 76, 77 actuated by the alarming lever 75 are incorporated in the camera head 20. The switch 76 which fronts on the locus of the movement of the leading end of the alarming lever 75 constitutes itself a residual amount alarming switch for the thicker film. The switch 77 situated behind the locus constitutes itself a residual amount alarming switch for the thinner film. The ON and OFF signals of these switches 76, 77 are forwarded to the control circuit.

FIG. 4 is a block diagram illustrating the control circuit. The residual amount alarming switch 76 for the thicker film and the residual amount alarming switch 77 for the thinner film are severally connected to a multiplexer 78 and are adapted to forward ON-OFF signals thereto. Similarly, the switch 70 is connected to the multiplexer 78 and adapted to forward ON-OFF signals thereto. To the multiplexer 78 is further connected an alarming part 79, which is formed of a lamp or a buzzer, for example. The actuation of the alarming part 79 with an input signal occurs when the operator manipulates the knob 68 to forward to the multiplexer 78 via the switch 70 a signal indicating that the thicker film has been loaded and, in consequence of the delivery of the signal, the residual amount alarming switch 76 for the thicker film is turned ON and when the signal indicating that the thinner film has been loaded is forwarded via the switch 70 to the multiplexer 78 and, as the result, the residual amount alarming switch 77 for the thinner film has been turned ON. When either of the two residual amount alarming switches 76, 77 is set into motion, depending on the operating position of the thickness switch 70, by the multiplexer 78, an operating signal is forwarded t the alarming part 79.

Now, the procedure for the operation of the residual amount detecting apparatus for a roll film according to this invention will be described below.

When the thicker roll film is loaded in the camera head 20, for example, the operator depresses the switching knob and, as the result, the displaying window 63 is opened to expose the numerical value inscribed on the residual amount displaying scale 61 for the thicker film and the other displaying window 64 is closed with the switching plate 65. As the photographing of original images on the roll film F is continued with the displaying windows held in this state, the roll film F is played off the supply reel 28 and wound on the takeup reel 29. As the result, the diameter of the part of the roll film still wound in a cylindrical shape around the supply reel 28 gradually decreases and the residual amount detecting lever 52 is displaced clockwise in the position of FIG. 2. This rotation of the residual amount detecting lever 52 imparts a gradual rotation to the residual amount displaying plate 60 via the interlocking shaft 50, the interlocking levers 54, 56, and the operating shaft 54. The residual length of the roll film F proportionate to the diameter of the roll film wound on the supply reel 28 is displayed by being exposed through the displaying window 63.

When the residual amount of the roll film decreases to a fixed level, e.g. to less than 5 feet, the ground of the scale colored in red, R, for example, is exposed through the displaying window 63. When the switching plate 65 is operated with the knob 68, the signal indicating that the thicker film has been loaded is forwarded from the switch 70 to the multiplexer 78. When the residual amount turns ON the residual amount alarming switch 76 for the thicker film, the length decreases below the prescribed level and, as the result, the alarming lever 75 signal is sent to the alarming part 79 to actuate the alarming lamp or the alarming buzzer. This alarm prompts the operator to make preparation for the loading of a new roll of film.

This invention has been described as embodied in photographing original images on the thicker film. Similarly, when the photographing is made on a thinner film, the residual length of the film is indicated through the displaying window 64 and the alarm is issued to indicate that the residual length of the film decreases to the prescribed level mentioned above.

The illustrated embodiment represents a case wherein the diameter of the roll film wound on the supply reel 28 is measured with the residual amount detecting lever 52 and the residual length of the roll film is consequently detected. Optionally, this embodiment may be modified so that the diameter of the roll film on the takeup reel 29 is measured and the residual amount of the film wound on the supply reel 28 is calculated from the diameter. It is further permissible to detect the angle of rotation of the lever 52 electrically and calculating the residual amount of the film by processing the result of the electric detection with a microcomputer of suitable software.

When the number of kinds of film in terms of thickness is 3 or more, as many scales as the kinds of film are to be inscribed on the residual amount displaying plate 60 and the number of displaying windows and that of through holes are to be each equalized to that of kinds of film mentioned above.

The illustrated embodiment is so constructed that the detection of the residual amount of film is accomplished by measuring the diameter of the roll film with the residual amount detecting lever 52 and calculating the residual amount of film from the diameter. Since the thicker film or the thinner film has a prefixed total length, the residual length of the film may be detected from the distance over which the film is conveyed during the photographing operation. In this case, the calculation of the residual length from the distance of conveyance is accomplished by using a microcomputer in taking count of pulses supplied to a pulse motor (not shown) used for driving the feed roller 41.

Alternatively, the detection of the residual amount of roll film may be effected by starting to take count of the revolution number of the supply reel 28 or the takeup reel 29 from the time the roll film is loaded thereby continuing the measurement of the total length of conveyance of the roll film and calculating the residual amount of the roll film from the result of the measurement. An encoder may be used, for example, for the measurement of the revolution number of the reel.

Yet another method for the detection of the residual length of roll film may resort to the measurement of the angle of rotation of the supply reel 28 or the takeup reel 29 relative to the conveyance of one frame of film, for example, by the feeding roller 41 by virtue of the fact that even when the roll film is conveyed in a fixed length by the pinch rollers 41, the angle of rotation of the reel varies in proportion as the diameter of roll film is varied. The detection of the angle of rotation is accomplished by means of an encoder connected to the reel.

In the illustrated embodiment, the residual amount displaying plate 60 is used as a device for displaying the residual length of roll film. When the residual amount of roll film is obtained in the form of an electric signal as contemplated in another embodiment mentioned above, a displaying device capable of showing the numeral indicating the residual length with light may be employed.

What is claimed is:

1. A roll film camera for photographing original images on a strip of film wound up in a roll, which comprises:

a supply reel for winding thereon the part of said roll film yet to be used for photographing original images, a takeup reel for winding the part of said roll film already used for photographing original images, photographing means disposed between said supply reel and said takeup reel and adapted to expose said roll film to original images and effect the photographing of original images on said roll film, takeup means for causing said roll film to be taken up on said takeup reel from said supply reel synchronously with the photographing motion of said photographing means, detecting means for detecting the diameter of said roll film wound on said supply reel, designating means for designating the thickness of said roll film, and converting means for converting the diameter of said roll film detected by said detecting means into the length of said roll film in accordance with the thickness of said roll film designated by said designating means.

2. A roll film camera according to claim 1, which further comprises displaying means for displaying the length of said roll film resulting from the conversion by said converting means.

3. A roll film camera according to claim 1, which further comprises displaying means for displaying an alarm on the residual amount of said roll film when the length of said roll film resulting from the conversion by said converting means has reached a prescribed value.

4. A roll film camera according to claim 1, wherein said detecting means is adapted to detect the diameter of the roll film wound on said supply reel based on the diameter of roll film wound on said takeup reel.

5. A roll film camera for photographing original images on a strip of film wound up in a roll, which comprises:

a supply reel for winding thereon the part of said roll film yet to be used for photographing original images, means for sequentially feeding out said roll film from said supply reel, photographing means for projecting original images on said roll film fed out of said supply reel by said feeding and consequently photographing said original images on said roll film, detecting means for detecting the diameter of said roll film wound on said supply reel, designating means for the designating the thickness of said roll film, and converting means for converting the diameter of said roll film detected by said detecting means into the length of said roll film in accordance with the thickness of said roll film designated by said designating means.

6. A microfilm camera according to claim 5, which further comprises displaying means for displaying the length of said roll film resulting from the conversion by said converting means.

7. A microfilm camera according to claim 5, which further comprises displaying means for displaying an alarm on the residual amount of said roll film when the length of said roll film resulting from the conversion by said converting means has reached a prescribed value.

8. A roll film camera capable of being loaded alternatively with first and second roll films differing in thickness, which comprises:

a supply reel for winding a roll film for photographing original images, feeding means for sequentially feeding said roll film from said supply reel, photographing means for projecting original images on said roll film fed out of said supply reel by said feeding means and consequently photographing said original images on said roll film, detecting means for detecting the diameter of said roll film wound on said supply reel, first signal generating means for issuing a first signal when the diameter of said first roll film has reached a first prescribed value, second signal generating means for issuing a second signal when the diameter of second roll film has reached a second prescribed value, designating means for designating the kind of roll film loaded in the camera, and alarming means for issuing an alarm on the residual amount of said roll film based on said first signal from said first signal generating means when said designating means is designating the first roll film or based on said second signal from said second signal generating means when said designating means is designating said roll film.

9. A supply apparatus for feeding a strip of recording medium, which comprises:

a supply reel for winding the part of said strip of recording medium yet to be used, payout means for sequentially paying out said strip of recording medium wound on said supply reel, detecting means for detecting the diameter of said strip of recording medium wound on said supply reel, designating mean for designating the thickness of said strip of recording medium, and converting means for converting the diameter of said strip of recording medium detected by said detecting means into the length of said strip of recording medium in accordance with the thickness of said recording medium designated by said designating means.

10. A supply apparatus according to claim 9, which further comprises displaying means for displaying the length of said strip of recording medium resulting from the conversion by said converting means.

11. A supply apparatus according to claim 9, which further comprises displaying mean for displaying an alarm as to the residual amount of said roll film when the length of said recording medium converted by said converting means has reached a prescribed value.

12. A supply apparatus for supplying first and second strips of recording medium differing in thickness, which comprises:

a supply reel for winding said strips of recording medium, payout means for sequentially feeding said recording medium from said supply reel, detecting means for detecting the diameter of said recording medium wound on said supply reel, first signal generating means for issuing a first signal when the diameter of said first recording medium has reached a first prescribed value, second signal generating means for issuing a second signal when the diameter of said second recording medium has reaches a second prescribed value, and alarming means for issuing an alarm on the residual amount of said recording medium, based on said first signal from said first signal generating means when said designating means is designating said first recording medium or based on said second signal from said second signal generating means when said designating means is designating said second recording medium.

13. A supply apparatus according to claim 12, which further comprises displaying device for displaying the length of said recording medium converted by said converting means.

14. A supply apparatus according to claim 12, which further comprises displaying means for issuing an alarm on the residual amount of said roll film when the length of said recording medium converted by said converting means has reached a prescribed value.

* * * * *